United States Patent [19]
Lay

[11] Patent Number: 6,164,679
[45] Date of Patent: *Dec. 26, 2000

[54] SPARE WHEEL ASSEMBLY FOR TRAILERS

[75] Inventor: Alvin Loise Lay, Cantonement, Fla.

[73] Assignee: EZ Way, Inc., Pensacola, Fla.

[ * ] Notice: This patent is subject to a terminal disclaimer.

[21] Appl. No.: 09/124,070

[22] Filed: Jul. 29, 1998

Related U.S. Application Data

[63] Continuation-in-part of application No. 08/629,137, Apr. 8, 1996, Pat. No. 5,813,687.
[51] Int. Cl.$^7$ .............................. B60P 3/10; B62D 63/08; B62D 61/12
[52] U.S. Cl. ..................... 280/414.1; 280/767; 280/475
[58] Field of Search .................. 280/414.1, 767, 280/475, 414.2, 414.3, 763.1, 414.5, 43, DIG. 8, 766.1, 765.1, 764.1; 301/132, 130, 131, 124.1; 414/466, 463, 464, 462; 114/344; 254/418; 224/555

[56] References Cited

U.S. PATENT DOCUMENTS

| | | | |
|---|---|---|---|
| 1,108,690 | 8/1914 | Brewster | 301/130 |
| 1,479,273 | 1/1924 | Armstrong | 301/130 |
| 5,269,593 | 12/1993 | Wasson | 301/130 |
| 5,813,687 | 9/1998 | Lay et al. | 280/414.1 |

*Primary Examiner*—Douglas C. Butler
*Attorney, Agent, or Firm*—Dowell & Dowell, P.C.

[57] ABSTRACT

An auxiliary wheel assembly for temporarily supporting one side of a trailer frame wherein the assembly includes a wheel carried by a support tube and wherein clamping elements are used for securing the tube to and directly beneath the frame without interfering with the structural integrity of the frame. The assembly also includes a flexible reinforcing member which is adapted to extend between frame members on opposite side of the trailer to prevent twisting of the frame.

20 Claims, 3 Drawing Sheets

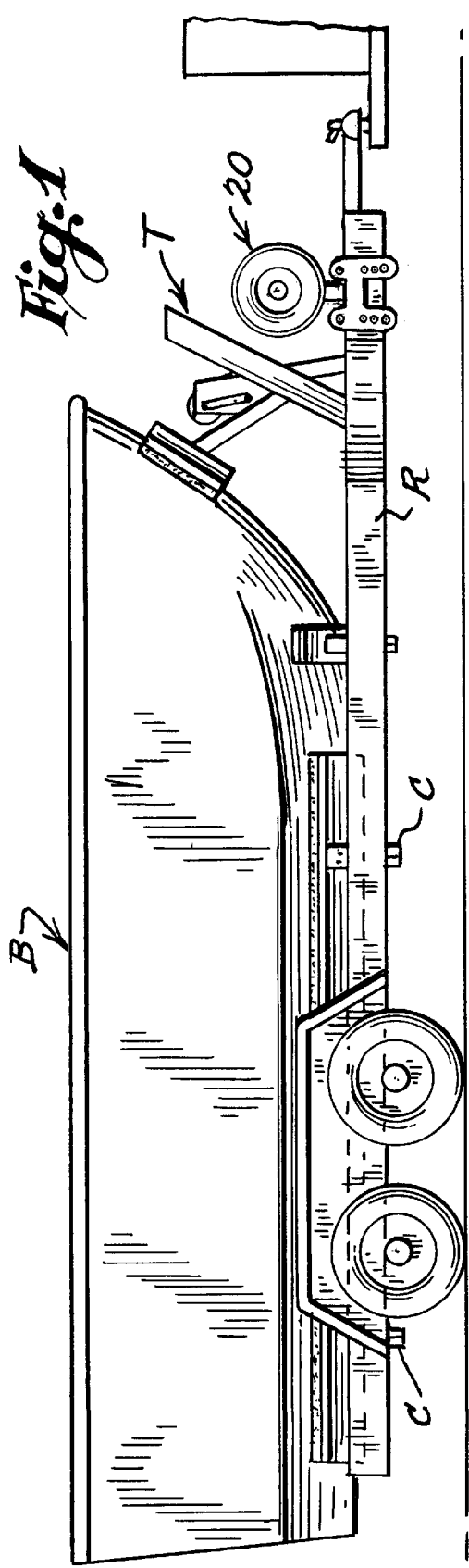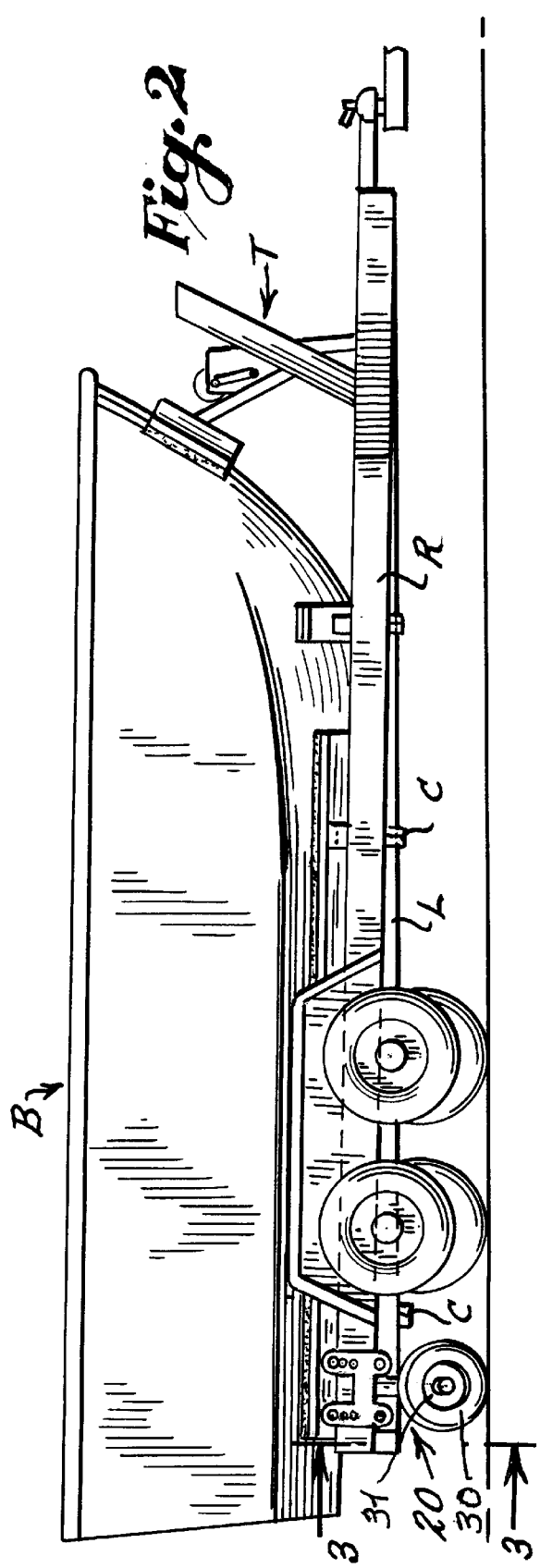

SPARE WHEEL ASSEMBLY FOR TRAILERS

CROSS REFERENCE TO RELATED APPLICATIONS

This application is a continuation-in-part of U.S. patent application Ser. No. 08/629,137, filed Apr. 8, 1996, entitled, SPARE WHEEL ASSEMBLY FOR TRAILERS, now U.S. Pat. No. 5,813,687 issued on Sep. 29, 1998.

BACKGROUND OF THE INVENTION

1. Field of the Invention

This invention is generally directed to auxiliary wheels which may be utilized with conventional trailers so as to temporarily make a disabled trailer roadworthy. More particularly, the present invention is directed to an auxiliary wheel assembly which is adapted to be mounted to conventional trailers in such a manner so as to preserve and reinforce the integrity of the trailer frames.

2. History of the Related Art

In U.S. Pat. No. 3,879,058 to Horn, a spare wheel is disclosed which is designed to be mounted to a trailer in such a manner that the wheel may be moved into supporting position with respect to a trailer frame in the event of a breakdown of a tire, wheel, axle or bearing on either side of the trailer frame. The spare wheel includes a mounting structure including a cross-member and an arcuate bar which are mounted beneath the frame of a trailer and which carry a short axle which is pivoted centrally of the cross-member and which supports the wheel at its outer end. The wheel and axle are normally locked in an elevated position beneath the trailer frame but may be lowered and pivoted along the arcuate bar to thereby align with brackets positioned on either side of the frame. The pivoting or swinging movement of the spare wheel is permitted by elevating the side of the frame which the spare wheel is to support.

The patent to Horn recognizes the benefits to be obtained by a spare wheel specifically adapted for use with trailers. Conventionally, most trailers, especially lightweight trailers utilized to tow vehicles such as boats, are not equipped with a spare tire, replacement bearing or axle. In the event of a flat tire or other undercarriage breakdown, it has been necessary to pull a trailer off a travel surface and arrange for repair to be made at the location of the breakdown. This requires that repairs be made under hazardous conditions along traveled highways and, in many instances, requires at least a temporary abandonment of the trailer and any vehicle or item being transported on the trailer.

Unfortunately, the spare wheel assembly of Horn requires major modification to a conventional trailer frame. The assembly is quite complex and is designed to be permanently mounted to the frame. As the wheel assembly is permanently mounted to the frame, and beneath the frame, the assembly is subject to becoming damaged by dirt, rocks, oil, tar and other debris. In addition, if the trailer to which the spare wheel assembly is used to launch or retrieve a craft from the water, further deterioration of the wheel assembly occurs. The wheel assembly is also locked generally centrally beneath the trailer frame in a position which is not easy to reach. It is therefore difficult for an individual to release the assembly in an emergency.

Other spare wheel assemblies have been specifically designed for use with trailers. Some such assemblies are mounted so as to provide support for the tongue of a trailer when the trailer is released from a towing vehicle. Other spare wheel assemblies are designed to be directly bolted to the frame of a trailer but require that the structural integrity of the frame be altered by making openings therethrough. Such changes in a frame can result in premature failure of the frame.

A further drawback with prior art spare or auxiliary wheel assemblies for use with trailers is that they are designed to be utilized with a specific size of trailer. If an individual or business owns several sizes of trailers, it is necessary to have separate spare wheel assemblies for each trailer.

SUMMARY OF THE INVENTION

The present invention is directed to a spare wheel assembly for use with trailers which overcomes the deficiencies of the prior art as set forth above and wherein the assembly is designed to be stowed when not in use in a position where it will not become damaged due to exposure to natural elements and wherein it may be placed into use quickly and easily with minimal risk of possible injury to an individual. Further, the spare wheel assembly of the present invention is designed to be universally adaptable to a plurality of differently sized trailers and to be securely mounted to such trailers without adversely affecting the integrity of the trailer frames.

The present invention is directed to a spare wheel assembly for trailers which includes a wheel rotatably mounted to a spindle carried by a vertical support strut or tube. The strut, which may be vertically adjustable in some embodiments, is clamped to a frame member of a trailer in such a manner that the strut is positioned directly beneath a frame member. The support tube or strut is provided along its upper portion with a generally L-shaped flange which is engageable against an upper end and one side of the frame member. In a preferred embodiment, the flange is provided with at least two spaced sets of at least two vertically spaced openings. At least one clamping plate is also provided having vertically spaced openings therein which are alignable with the openings in the L-shaped flange. A set of four bolts is utilized to secure the clamping plate or plates on an opposite side of the frame member from the L-shaped flange so that the frame is clamped therebetween.

In a preferred embodiment, each set of openings in the L-shaped flange and the clamping plate or plates includes a plurality of upper vertically spaced openings and at least one lower opening. The spacing between the upper openings is designed to allow bolts to be extended therethrough in a number of spaced relationships with respect to the lower openings to thereby accommodate different sizes of trailer frame members.

Also, in the preferred embodiment, the spindle which extends from the wheel of the assembly to the support strut is angled generally downwardly and outwardly relative to a longitudinal axis of the strut so that a tire carried by the wheel is in proper engagement with a travel surface when the wheel assembly is in use.

The spare wheel assembly also includes a flexible frame reinforcing element which is secured at one end to the support strut and which is adapted to extend therefrom and around an opposite side or frame member of a trailer when the assembly is in use. In the preferred embodiment, the reinforcing element is a heavy duty chain which is connected at the base of the strut and is of a length to extend beneath a trailer frame and around opposite sides of the frame before being secured to itself. The chain functions as a cross brace to prevent any twisting or bending of the frame when the spare wheel assembly is in use.

It is a primary object of the present invention to provide a spare wheel assembly for trailers which may be easily clamped to frame members of conventional trailers in such a manner that the assembly is securely and rigidly retained in position when in use.

It is also an object of the present invention to provide a spare wheel assembly which may be utilized to support one side of a trailer frame in the event a tire, wheel, axle or bearing becomes damaged to allow the emergency transport of the trailer to a site where repairs can be safely and conveniently made and wherein the wheel assembly may be mounted to a frame member utilizing a conventional lug wrench so that only tools normally carried by a towing vehicle are necessary to secure the wheel assembly in an operative position.

It is also an object of the present invention to provide a spare wheel assembly for use with trailers which may be stowed in an out-of-the-way position such as within the trunk of a vehicle and which may be readily installed when necessary to provide stability for the trailer.

It is yet another object of the present invention to provide an auxiliary wheel assembly for use with trailers wherein the assembly is clamped to the frame of a trailer in such a manner so as to preserve the structural integrity of the frames and wherein the assembly includes a flexible reinforcing element to prevent frame twisting or bending when in use.

An additional object of the present invention is to provide an auxiliary wheel assembly for use in the emergency towing of a trailer wherein the assembly is mounted so as to be properly positioned to provide maximum stability for the trailer frame.

BRIEF DESCRIPTION OF THE DRAWINGS

FIG. 1 is a right side elevational view showing the auxiliary wheel assembly of the present invention in one proposed stowed position along the forward portion of a trailer;

FIG. 2 is a right side elevational view showing the auxiliary wheel assembly of the present invention mounted in position supporting the right frame member of the trailer shown in FIG. 1;

DESCRIPTION OF THE PREFERRED EMBODIMENT

With continued reference to the drawings, and as specifically illustrated in FIGS. 1 and 2, the spare or auxiliary wheel assembly 20 of the present invention is designed for use with conventional trailers "T" which normally include left and right side primary frame members "L" and "R" which are reinforced along the length of the trailer by cross components "C". The trailer depicted is a conventional tandem axle trailer for supporting a boat "B". The axles support opposite wheels to which tires are mounted.

Figure 4:
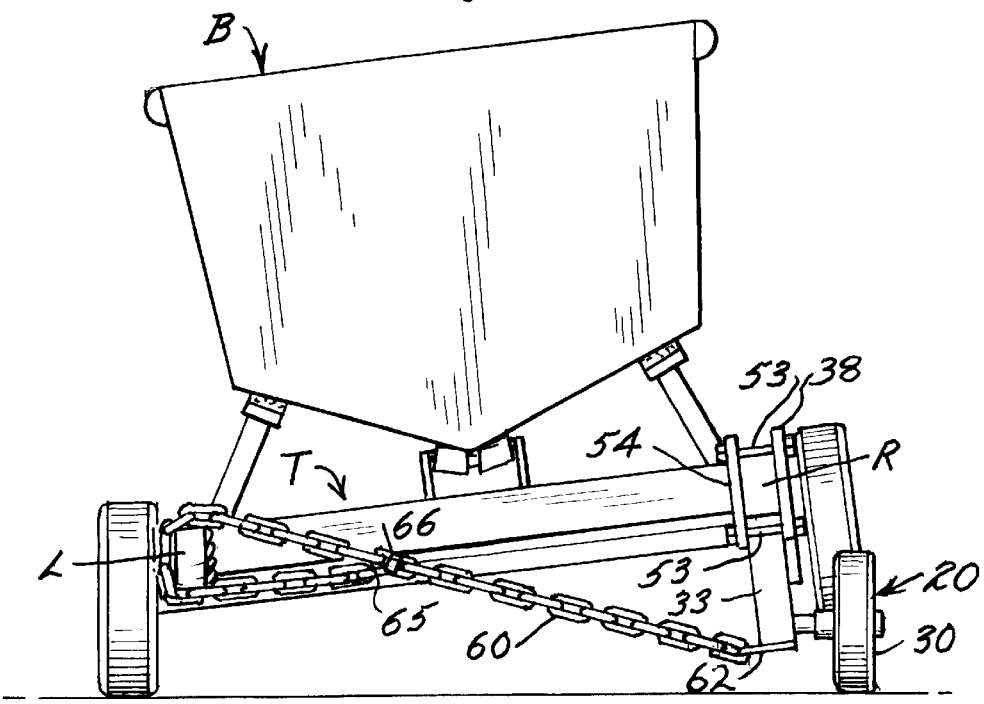
FIG. 4 is a rear elevational view taken along lines 4—4 of FIG. 2.

In FIG. 1, the auxiliary wheel assembly 20 is positioned in a stored or stowed position adjacent the forward portion of the frame. In the event of a failure of either the tires, wheels, bearings, or axles, the auxiliary wheel assembly is placed into use in a manner as illustrated in FIGS. 2 and 4 wherein the assembly is secured to the right frame member "R" rearwardly of the affected wheel, tire, bearing or axle.

The manner of mounting the assembly will be discussed in greater detail hereinafter.

The auxiliary wheel assembly 20 includes a tire 30 mounted to a wheel hub 31 which is rotatably mounted to a spindle 32 fixedly secured at one end to a vertically extending support tube or strut 33. In the embodiment shown, the strut 33 is preferably formed of a generally rectangular cross-section hollow tube although other configurations and cross-sectional structures may be utilized in keeping with the teachings of the present invention. Although not shown in the drawing Figures, the strut 33 may include telescoping components such that the strut can be vertically adjusted in length. The spindle 32, in the preferred embodiment, is canted slightly downwardly and outwardly at an angle "C" with respect to an elongated vertical axis "A—A" of the strut 33 to provide stability for the assembly when a load is applied thereto during use. As specifically shown in FIG. 4, the wheel and tire are shown oriented outwardly with respect to frame member "R", however, it is possible that the tire may oriented inwardly relative to frame member "R" when in use.

To mount the support strut 33 to the frame member "R" in such a manner as to not change or adversely affect the integrity of the frame, the present invention utilizes a unique clamping system for securing the wheel assembly in operative position. Welded to or integrally formed with the upper portion 35 of the support strut 33 is an L-shaped mounting flange 36 having a vertical plate 38 and a horizontal plate 40 which is notched at 41 to receive the upper portion of the support strut. The L-shaped member may be formed of a piece of channel iron which is 10 configured as necessary and which is welded to the strut.

Figure 5:
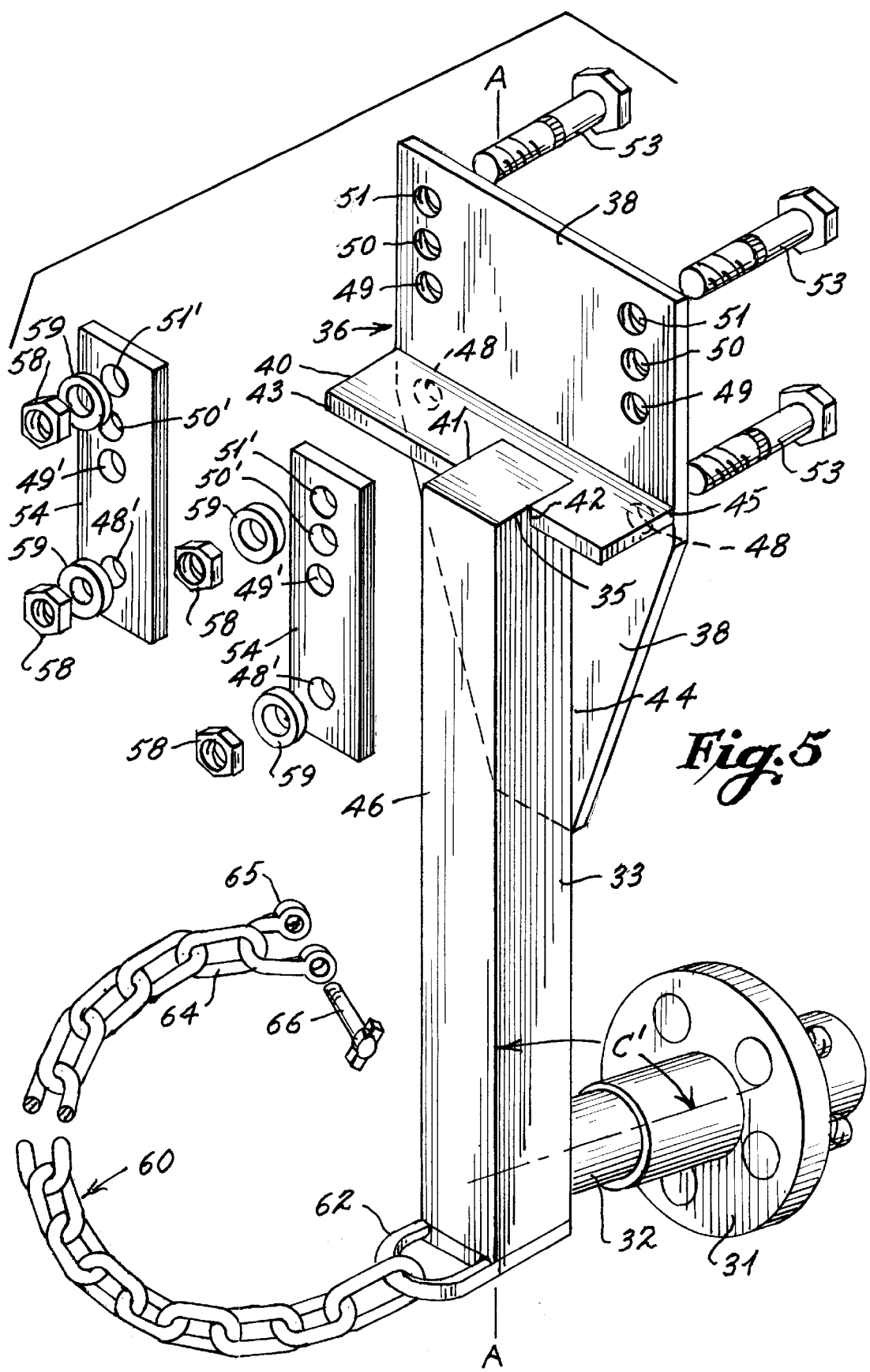
FIG. 5 is a perspective assembly view of the wheel assembly of the present invention.

However, as shown in FIG. 5, the L-shaped mounting flange may also be formed so that the vertical plate 38 is welded at 44 generally co-extensive with the outer face of the adjacent side wall of the strut with the horizontal flange or plate 40 welded at 45 to the vertical plate 38 and at 42 to the upper portion of the strut with the outer edge 43 of the plate 40 terminating in spaced relationship with face or side wall 46 of the strut 33.

The trailer frame member "R" is generally either C-shaped or rectangular in cross-section. It is important to note that the size of the L-shaped flange is such that the plate 40 is smaller than the width of the frame member "R" so that the plate terminates from the side wall of the frame member to thereby allow the support strut to be mounted to frame members of different sizes.

Figure 3:
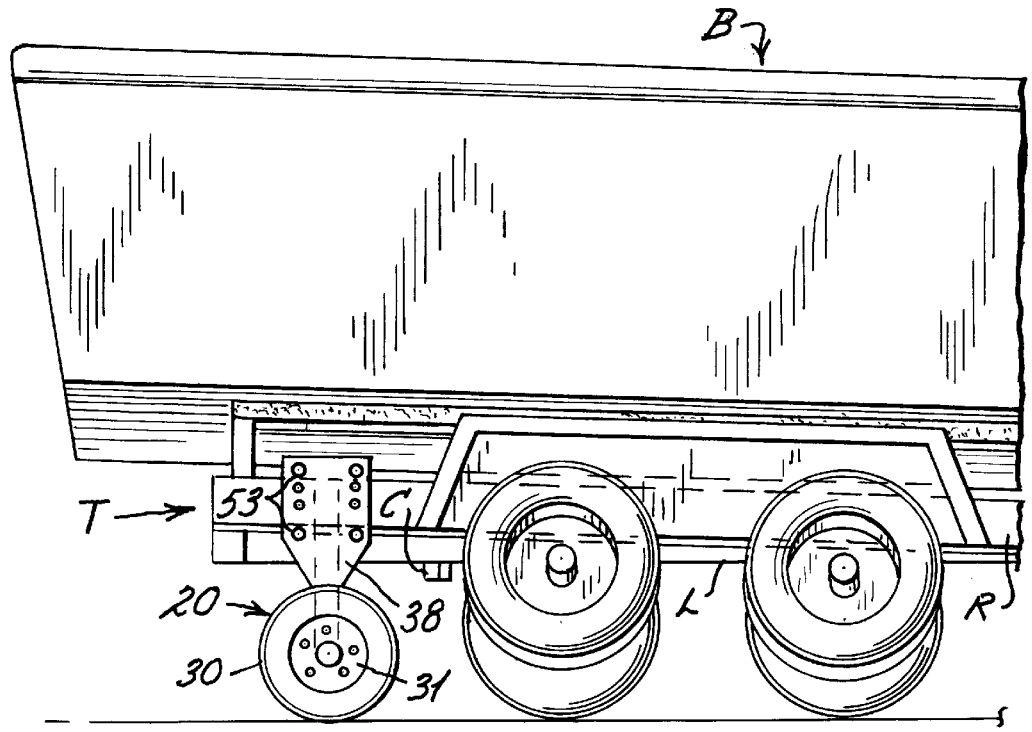
FIG. 3 is an enlarged partial side elevational view similar to FIG. 2.

The vertical plate of the L-shaped flange includes two spaced sets of upper and lower openings created therein. The openings in each set are generally aligned horizontally with respect to one another. Each set of openings includes at least one lower opening 48 provided in the lower portion of the vertical plate 38 below the horizontal plate 40. Each set of openings also includes at least one and preferably a plurality of upper openings 49, 50 and 51. The spacing of the upper openings relative to the lower openings are specifically designed to allow the auxiliary wheel assembly to be secured to various sizes of frame members "R" having different height dimensions. When the auxiliary wheel assembly is mounted to a frame, the clamping components are closely engageable relative to the top, sides and bottom of the frame member "R", as shown in FIG. 3, so as to prevent any relative twisting or movement of the clamping elements, and thus the assembly, relative to the frame when a load is applied to the wheel assembly in a manner as shown in FIG. 2. As shown in FIG. 3, the frame member "R" is relatively large and therefore the openings 51 are utilized for purposes of receiving mounting bolts 53 for securing the auxiliary wheel assembly to the frame. The number of upper and lower openings may be varied as desired.

To clamp the wheel assembly to the frame member, in the preferred embodiment, a pair of separate clamping plates 54 are provided, as shown in FIG. 5. Each of the clamping plates includes a plurality of spaced upper openings 49', 50' and 51' which are equally spaced relative to the openings 49, 50 and 51 in the vertical plate 38 of the L-shaped mounting flange 36. The clamping plates further include a lower opening 48' which is aligned with one of the openings 48 in the lower portion of the plate 38. The clamping plates are positioned on the opposite side of the frame member "R" from the plate 38 and thereafter four mounting bolts 53 are inserted through the aligned openings so as to be positioned immediately adjacent to the upper wall of the frame member and immediately below the horizontal flange 40 of the L-shaped support 36. In some embodiments, the openings 49', 50' and 51' may be threaded so that threaded outer ends of the bolts 53 may be threadingly engaged thereto. In the drawing figures, however, separate lock nuts 58 are shown as being secured to the outer threaded ends of the bolts 53. Appropriate lock washers 59 may also be utilized. If a smaller frame member is encountered, the second lower set of openings 50 and 50' in both the plate 38 and the clamping plates 54 are used and receive the bolts 53 to secure the auxiliary wheel assembly to the frame. Likewise, a smaller frame would require that the bolts 53 be aligned through openings 51 and 51' and thereafter secured in position. As opposed to separate clamping plates 54, a single plate having both sets of openings therethrough may be used.

When the frame member "R" is seated within the L-shaped support flange 36, the load of the frame is directed over and generally aligned with the central axis A—A of the support strut 33, as shown in FIG. 3. This allows for a maximum load to be carried by the auxiliary wheel assembly without fear of distorting or bending the support strut.

To prevent a trailer frame from being twisted or bent when the wheel assembly of the present invention is in use as shown in FIG. 2, a flexible reinforcing member such as a chain 60 is secured at one end to a retention ring 62 welded or otherwise secured to the base of the strut 33. The chain is of sufficient length so that it can be extended from the strut which is secured to the right frame member "R" beneath the trailer and around the opposite frame member "L". Thereafter, the end 64 of the chain is wrapped one or more times about the frame member "L" and tied in a knot to a section of the chain adjacent member "L" and then pulled taut and secured to an intermediate portion of the chain using a shackle 65 and locking pin 66. Wrapping of the chain will minimize stress on the shackle and locking pin.

As shown in FIG. 4, when the spare wheel assembly is in use, it is possible that one side of the trailer frame may become elevated with respect to the opposite side. To prevent the frame from bending or twisting, the chain will distribute and offset any adverse torque or force which may be created between the opposite sides of the frame. Although a chain is shown in the preferred embodiment, cable, heavy rope or similar flexible but sturdy reinforcing members may be used.

In the use of the auxiliary wheel assembly of the present invention, in the event a tire, wheel, bearing or axle of a conventional trailer becomes inoperative or damaged, the auxiliary wheel assembly is removed from a stowed position. As illustrated in FIG. 1, the wheel assembly may be mounted in an inverted relationship with respect to one of the frame members of the trailer with the wheel and tire being raised vertically above the frame. When it is necessary to place the auxiliary wheel assembly in use, it may simply be removed utilizing a conventional lug wrench. In this regard, it should be noted that the bolts 53 and nuts 58 are specifically designed to be of a size which is complementary to a conventional lug wrench so that no other tools are necessary to mount the assembly.

Thereafter, the L-shaped support flange is engaged against the bottom and one side of the frame member "R". The clamping plates are then aligned on the opposite side of the frame and the bolts inserted through the appropriately aligned openings therein so as to closely embrace the frame. Thereafter, the plates and vertical plate 38 of the flange 36 are clamped to the frame "R" using the nuts 50. The chain is then extended beneath the trailer and around the appropriate frame member, wrapped, knotted and then pulled taut and locked into position.

Because the mounting bolts substantially abut the upper and lower portions of the frame, respectively, even if one of the bolts were to become loose, the auxiliary wheel assembly will bind against the frame during forward or rearward motion of the towing vehicle. Thus, the auxiliary wheel assembly will not shift relative to the frame when in use. In view of the foregoing, the present invention provides a unique auxiliary or spare wheel for trailers which includes an adjustable bracket system which clamps to a frame of a conventional trailer such that there is no adverse affect to the integrity of the frame.

What is claimed is:

1. An auxiliary wheel assembly adapted to be mounted to one of a pair of spaced frame members of a trailer, the auxiliary wheel assembly comprising:

a support member having upper and lower end portions and an elongated axis;

clamping means adapted to secure said support member to one of the pair of spaced frame members without adversely affecting the structural integrity of the frame member, said clamping means including a frame member support portion mounted to said upper end portion of said support member;

a wheel;

spindle means for connecting said wheel to said support member, and the auxiliary wheel assembly including a flexible reinforcing member connected thereto, and said flexible reinforcing member being of a length and having a free end adapted to be extended laterally with respect to said support member and looped about another of the pair of spaced frame members to thereby provide frame reinforcement when the auxiliary wheel assembly is in use.

2. The auxiliary wheel assembly of claim 1 in which said spindle means is connected to said support member so as to extend generally outwardly and downwardly relative to the elongated axis thereof at an angle greater than 90°.

3. The auxiliary wheel assembly of claim 1 in which said frame member support portion of said clamping means includes a generally L-shaped support flange having a first portion extending generally parallel to said elongated axis of said support member and a second portion extending generally perpendicular to said elongated axis, spaced openings in said first portion, said clamping means further including at least one clamping plate having upper and lower vertically spaced openings therein, and bolts extending through aligned openings in said at least one clamping plate and said first portion of said L-shaped support flange for securing said auxiliary wheel assembly to the one frame member.

4. The auxiliary wheel assembly of claim 3 in which said first portion of said L-shaped support flange includes two spaced sets of a plurality of upper openings and two spaced lower openings and said at least one clamping plate includes a plurality of vertically spaced upper openings and at least one lower opening, whereby the auxiliary wheel assembly may be mounted to different sizes of trailer frame members.

5. The auxiliary wheel assembly of claim 4 wherein said support member includes opposite side walls, said first portion of said L-shaped support flange extending generally flush with one of said opposing side walls and said second portion having an edge terminating in spaced relationship with the other of said opposite side walls.

6. The auxiliary wheel assembly of claim 5 including a pair of said clamping plates.

7. The auxiliary wheel assembly of claim 6 including means for connecting said flexible reinforcing member to said support member and including means for securing said free end of said flexible reinforcing member to said reinforcing member after being looped about the other of the pair of spaced frame members.

8. An auxiliary wheel assembly adapted to be selectively mounted to one of a pair of spaced frame members of a trailer to make the trailer roadworthy and wherein each frame member includes a bottom wall and at least one side wall, the auxiliary wheel assembly comprising:

a support member having upper and lower end portions and an elongated axis;

clamping means adapted to secure said support member to one of the pair of spaced frame members without adversely affecting the structural integrity of the frame member, said clamping means including a frame support portion, said frame support portion of said clamping means being generally L-shaped having a first portion extending generally parallel to said axis of said support member and adapted to engage the at least one side wall of the one frame member and a second portion mounted to said upper end portion of said support member and extending generally perpendicular to said axis and adapted to engage the bottom wall of the one frame member, said clamping means further including at least one clamping plate opposing and spaced from said first portion of said frame support portion and fastener means adapted to extend exteriorly of the one frame member for securing said at least one clamping plate to said first portion of said frame support portion to thereby mount said auxiliary wheel assembly to the one frame member;

a tire mounted to a wheel;

means for connecting said wheel to said support member; and a flexible reinforcing member connected to said support member, and said flexible reinforcing member being of a length and having a free end adapted to be extended laterally from the support member and looped about another of the pair of spaced frame members to thereby provide frame reinforcement when the auxiliary wheel assembly is in use.

9. The auxiliary wheel assembly of claim 8 in which said means for connecting said wheel to said support member is fixedly mounted to said support member so as to extend generally outwardly and downwardly relative to the elongated axis of the support member at an angle greater than 90°.

10. The auxiliary wheel assembly of claim 8 in which said first portion of said L-shaped support flange includes upper and lower portions with said lower portion extending below said second portion of said L-shaped flange, two spaced sets of a plurality of upper openings in said upper portion of said first portion of said L-shaped flange and two spaced lower openings in said lower portion of said first portion of said L-shaped flange, and said at least one clamping plate having a plurality of vertically spaced upper openings and at least one lower opening, whereby the auxiliary wheel assembly may be mounted to different sizes of trailer frame members.

11. The auxiliary wheel assembly of claim 10 wherein said support member includes opposite side walls, said lower portion of said first portion of said L-shaped support flange extending generally flush with one of said opposite side walls and said second portion terminating in spaced relationship from the other of said opposite side walls.

12. The auxiliary wheel assembly of claim 11 including a pair of said clamping plates.

13. The auxiliary wheel assembly of claim 8 including means for securing said free end of said flexible reinforcing member to said reinforcing member after being looped about the other of the pair of spaced frame members.

14. The auxiliary wheel assembly of claim 13 wherein said flexible reinforcing member is a chain of a length to be wrapped at least one time about the other of the pair of spaced frame members before said free end thereof is secured.

15. An auxiliary wheel assembly for use with a trailer having a frame member including a bottom wall and at least one side wall, the auxiliary wheel assembly comprising:

a support member having upper and lower end portions and an elongated axis;

clamping means adapted to secure said support member to the frame member without adversely affecting the structural integrity of the frame member, said clamping means including a frame support portion;

said frame support portion of said clamping means being generally L-shaped having a first portion extending generally parallel to said elongated axis of said support member and adapted to engage the at least one side wall of the frame member and a second portion mounted to said upper end portion of said support member and extending generally perpendicular to said elongated axis and adapted to engage the bottom wall of the frame member, said clamping means further including at least one clamping plate opposing and spaced from said first portion of said frame support portion and a fastener means adapted to extend exteriorly of the frame member for securing said clamping plate to said first portion of said frame support portion to thereby compress said at least one clamping plate and said first portion of said frame support portion relative to one another with the frame member therebetween to mount said auxiliary wheel assembly to the frame member;

a tire mounted to a wheel;

said wheel being rotatably connected relative to said support member; and a flexible reinforcing member connected to said support member, and said flexible reinforcing member being of a length and having a free end adapted to be extended laterally from said support member said looped about a spaced frame member to thereby provide frame reinforcement when the auxiliary wheel assembly is in use.

16. The auxiliary wheel assembly of claim 15 in which said first portion of said frame support portion of said clamping means includes spaced openings therein, said at least one clamping plate having upper and lower vertically spaced openings therein, and fastener means for compressively forcing including bolts extending through aligned openings in said clamping plate and said first portion of said frame support portion for securing said auxiliary wheel assembly to the frame member.

17. The auxiliary wheel assembly of claim 16 in which said first portion of said frame support portion includes upper and lower portions, two spaced sets of a plurality of upper openings in said upper portion and two spaced lower openings in said lower portion.

18. The auxiliary wheel assembly of claim 17 including a pair of clamping plates.

19. The auxiliary wheel assembly of claim 15 including means for securing said free end of said flexible reinforcing member to said reinforcing member after being looped about the spaced frame member.

20. The auxiliary wheel assembly of claim 19 wherein said flexible reinforcing member is a chain of a length to be wrapped at least one time about the spaced frame member before said free end thereof is secured.

* * * * *